(12) United States Patent
Kim et al.

(10) Patent No.: US 10,173,712 B2
(45) Date of Patent: Jan. 8, 2019

(54) STITCHLESS STEERING WHEEL FITTED WITH LEATHER

(71) Applicants: Hyundai Motor Company, Seoul (KR); Kia Motors Corporation, Seoul (KR); SECO KOMOS, Hwaseong-si (KR)

(72) Inventors: Eung Joo Kim, Suwon-si (KR); Un Jae Jung, Seoul (KR); Joon Mo Park, Seoul (KR); Ho June Sung, Hwaseong-si (KR)

(73) Assignees: Hyundai Motor Company, Seoul (KR); Kia Motors Corporation, Seoul (KR); SECO KOMOS, Hwaseong-si (KR)

( * ) Notice: Subject to any disclaimer, the term of this patent is extended or adjusted under 35 U.S.C. 154(b) by 0 days.

(21) Appl. No.: 15/359,350

(22) Filed: Nov. 22, 2016

(65) Prior Publication Data

US 2017/0274920 A1     Sep. 28, 2017

(30) Foreign Application Priority Data

Mar. 25, 2016  (KR) .......................... 10-2016-0035763

(51) Int. Cl.
    *B62D 1/06*   (2006.01)
(52) U.S. Cl.
    CPC ...................................... *B62D 1/06* (2013.01)
(58) Field of Classification Search
    CPC .. B62D 1/04; B62D 1/06; B62D 1/065; B29L 2031/3047; B60R 21/05
    See application file for complete search history.

(56) References Cited

U.S. PATENT DOCUMENTS

| 3,802,291 | A | * | 4/1974 | Young, Jr. | ................ B62D 1/06 74/552 |
| 4,581,954 | A |   | 4/1986 | Uchida | |
| 6,012,354 | A | * | 1/2000 | Futschik | .................. B62D 1/06 74/552 |
| 6,079,292 | A |   | 6/2000 | Raetsen | |
| 6,637,289 | B2 | * | 10/2003 | Kreuzer | .................. B62D 1/06 74/552 |
| 6,644,145 | B2 | * | 11/2003 | Albayrak | ................. B62D 1/06 74/552 |
| 7,392,725 | B2 | * | 7/2008 | Yasuda | .................... B62D 1/06 74/552 |
| 7,513,175 | B2 | * | 4/2009 | Xu | ......................... B60R 13/02 74/552 |

(Continued)

FOREIGN PATENT DOCUMENTS

DE        103 28 988 A1    1/2005
DE     10 2011 112 134 A1    3/2013

(Continued)

*Primary Examiner* — Adam D Rogers
(74) *Attorney, Agent, or Firm* — Morgan, Lewis & Bockius LLP

(57) ABSTRACT

A stitchless steering wheel fitted with leather, which is formed by covering a grip body with leather may include a first rim bezel mounted in a wheel groove of the grip body, and including a bezel groove to receive end portions of the leather, and a second rim bezel fastened in the bezel groove of the first rim bezel and fixing the end portions of the leather received in the bezel groove.

9 Claims, 3 Drawing Sheets

(56) References Cited

U.S. PATENT DOCUMENTS

| | | | | |
|---|---|---|---|---|
| 8,898,904 B2* | 12/2014 | Muller | ............... | B29C 63/0073 |
| | | | | 29/894.38 |
| 9,045,078 B2* | 6/2015 | Tovar | ..................... | B62D 1/046 |
| 9,139,217 B2* | 9/2015 | Bertrand | .................. | B62D 1/06 |
| 9,272,725 B2* | 3/2016 | Pekari | ................... | B62D 1/046 |
| 9,308,856 B2* | 4/2016 | Lisseman | ............... | B62D 1/046 |
| 9,352,768 B2* | 5/2016 | Doursoux | ................ | B62D 1/06 |
| 2009/0007721 A1* | 1/2009 | Cortina | .................. | B62D 1/06 |
| | | | | 74/558 |

FOREIGN PATENT DOCUMENTS

| | | |
|---|---|---|
| EP | 1 777 113 A2 | 4/2007 |
| EP | 2 511 153 A1 | 10/2012 |
| GB | 1 398 685 A | 6/1975 |
| JP | H04-163277 A | 6/1992 |
| JP | 2009-528200 A | 8/2009 |
| KR | 10-2009-0064181 A | 6/2009 |
| KR | 10-2010-0067760 A | 6/2010 |
| KR | 10-1307670 B1 | 9/2013 |
| WO | WO 2012/136948 A2 | 10/2012 |

\* cited by examiner

STITCHLESS STEERING WHEEL FITTED WITH LEATHER

CROSS-REFERENCE TO RELATED APPLICATION

The present application claims priority to Korean Patent Application No. 10-2016-0035763, filed Mar. 25, 2016, the entire contents of which is incorporated herein for all purposes by this reference.

BACKGROUND OF THE INVENTION

Field of the Invention

The present invention relates to a stitchless steering wheel fitted with leather. More particularly, to a technology of covering a steering wheel with leather, by fitting the leather into the steering wheel by using rim bezels and the like instead of sewing the leather.

Description of Related Art

In general, hand sewing is applied to cover a steering wheel for a vehicle with leather.

The hand sewing is carried out nearly completely manually when covering the steering wheel with leather.

As an example, the hand sewing process is carried out in the order of operations of testing raw fabric→cutting→sewing/punching (punching for connecting and sewing leather)→attaching a double-sides tape→cleaning surfaces (removing foreign substances)→applying adhesives→attaching leather→sewing→supplying hot air (removing wrinkles on the surface)→completing the covering operation.

Since hand sewing is carried out nearly completely manually, there is a problem in that a large amount of cycle time is needed.

Meanwhile, if stitch intervals are increased to reduce the cycle time required for the sewing, a deterioration of external appearance (i.e., separation of leather, low quality, and the like) occurs. Additionally, grip feeling when a driver holds the steering wheel is degraded because of unevenness of sewed line portions (displeasure when rotating and returning the steering wheel).

The process of supplying hot air is carried out to forcedly contract the leather in order to remove wrinkles after covering the steering wheel with the leather, but because of damage to a leather surface caused by a high temperature, problems such as deterioration in durability condition, discoloration of leather, and peeling off of leather occur.

One steering wheel typically has 400 to 450 stitches, and a cost required for sewing leather is about 24% of an overall price of manufacturing the steering wheel.

Some automakers sometimes use a method of fitting leather (stitchless) instead of hand sewing in order to solve the problems with the hand sewing, but because of the following problems, the method are rarely used.

First, because of deformation in polyurethane (PU) foam, deterioration in adhesive force of an adhesive, contractile force caused by contraction of leather, and the like, there is a problem in that leather is separated from a leather fitting groove and the leather peels under a high temperature condition.

Second, during the process of supplying hot air in order to remove wrinkles of leather, the leather peels due to contraction of the leather, and as a result, there is a problem in that a defect rate is increased in the manufacturing step.

Third, the leather is matched with a PU material with low hardness, which causes a collapse at an edge portion, such that a leather matching portion is separated due to contraction of the leather after the process of supplying hot air and the process of conditioning durability/heat-resistance, and as a result, a defect of an external appearance of the leather matching portion occurs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a stitchless steering wheel fitted with leather, in which a new leather fitting manner is implemented in which a first rim bezel for supporting a grip body and an edge portion of a leather matching portion and a second rim bezel having a leather fixing wedge are coupled by hooks, such that it is possible to solve a problem of a defect of an external appearance of the leather matching portion caused by PU collapse as well as a problem of leather peeling, and to improve fixing force of a leather fitting portion.

According to various aspects of the present invention, a stitchless steering wheel fitted with leather, which is formed by covering a grip body with leather may include a first rim bezel mounted in a wheel groove of the grip body, and including a bezel groove to receive end portions of the leather, and a second rim bezel fastened in the bezel groove of the first rim bezel and fixing the end portions of the leather received in the bezel groove.

The first rim bezel and the second rim bezel may be fastened to each other through coupling of second hooks formed on wall surfaces of the bezel groove of the first rim bezel and first hooks formed at a lower end portion of the second rim bezel.

Flanges having an arc-shaped cross section to support portions adjacent to the end portions of the leather, are formed around an upper end portion of the first rim bezel.

The flanges of the first rim bezel may be divided into a plurality of flange sections by a plurality of cut-away portions which is disposed at predetermined intervals along a rim circumference.

An adhesive for attaching the end portions of the leather may be applied onto wall surfaces of the bezel groove of the first rim bezel.

The first rim bezel may be mounted onto the grip body through a plurality of pins.

A plurality of pierced portions may be formed in the first rim bezel along a rim circumference so as to be disposed at predetermined intervals.

A leather fixing wedge fixing one surface of the leather which abuts an outer circumferential surface of the second rim bezel in a state in which the second rim bezel is fastened in the bezel groove, may be formed around the outer circumferential surface of the second rim bezel.

The stitchless steering wheel fitted with leather provided in various embodiments of the present invention has the following advantages.

First, a cycle time of a process of covering the steering wheel with the leather may be shortened by about 39%, thereby reducing material costs.

Second, external appearance marketability may be improved by applying the rim bezels, and external appearance marketability may be improved with various surface treatment processes (painting/plating) on the rim bezels.

Third, a defect rate and complaints caused by leather peeling may be reduced.

Fourth, it is possible to solve a problem of deterioration in grip feeling caused by surface unevenness of a sewing portion.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
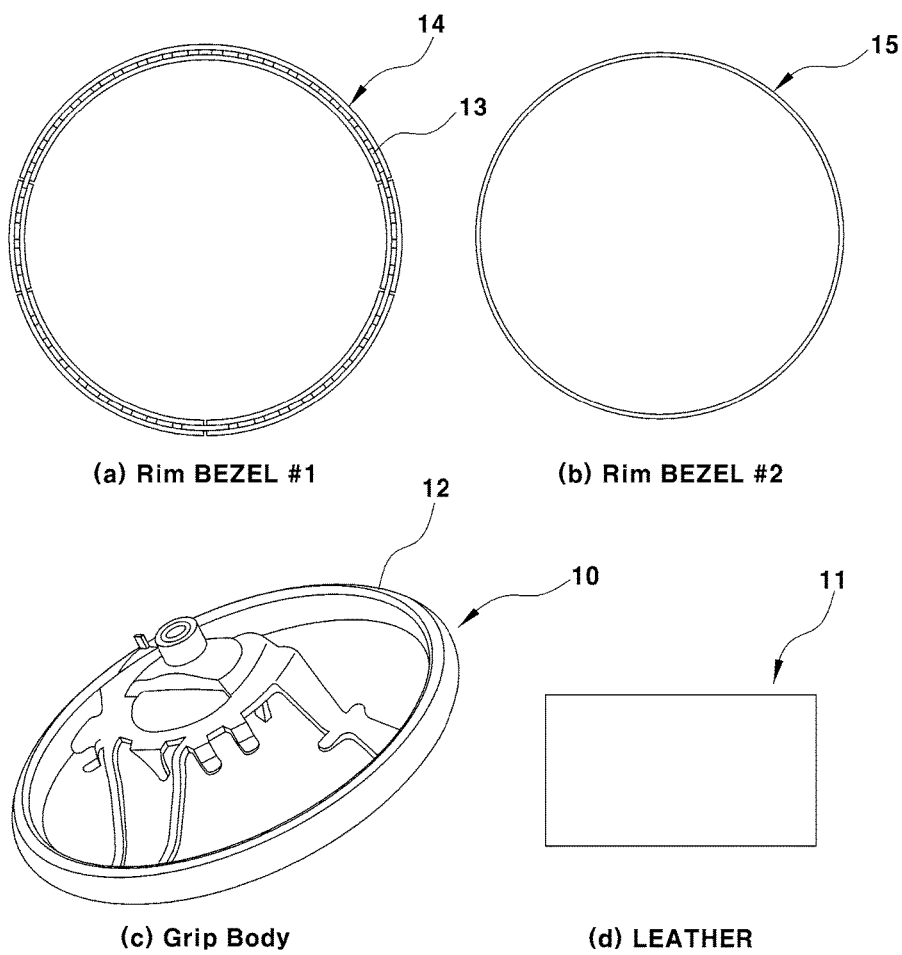
FIG. 1 is a schematic view illustrating components of a stitchless steering wheel fitted with leather according to various embodiments of the present invention.
Figure 2:
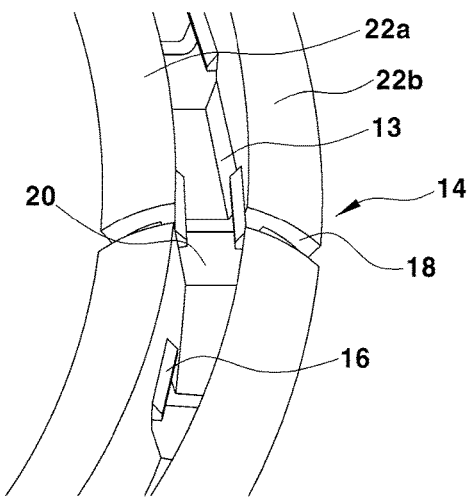
FIG. 2 is a schematic view illustrating features of a first rim bezel among the components of the stitchless steering wheel fitted with leather according to various embodiments of the present invention.
Figure 3:
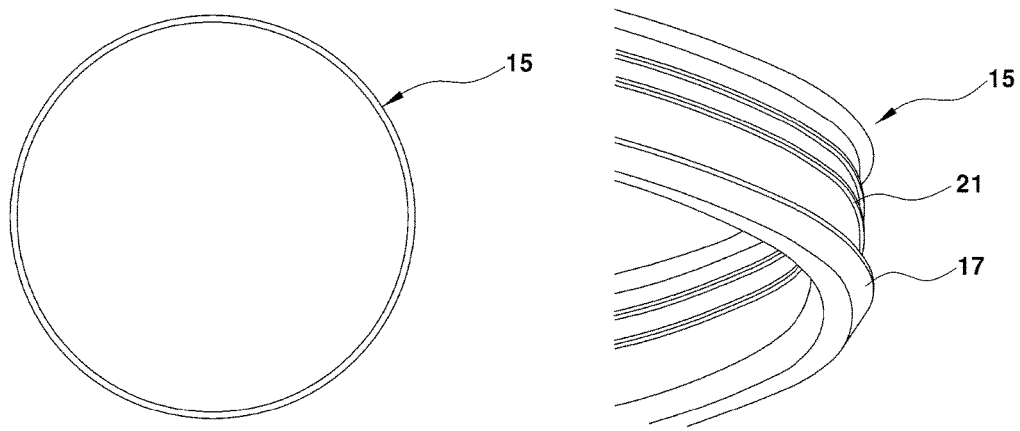
FIG. 3 is a schematic view illustrating features of a second rim bezel among the components of stitchless the steering wheel fitted with leather according to various embodiments of the present invention.

FIG. 1 is a schematic view illustrating components of a stitchless steering wheel fitted with leather according to various embodiments of the present invention, FIG. 2 is a schematic view illustrating features of a first rim bezel among the components of the stitchless steering wheel fitted with leather according to various embodiments of the present invention, and FIG. 3 is a schematic view illustrating features of a second rim bezel among the components of the stitchless steering wheel fitted with leather according to various embodiments of the present invention.

As illustrated in FIGS. 1 to 3, in the case of a stitchless steering wheel fitted with leather, leather, which covers a grip body, is fixed by two rim bezels, that is, a first rim bezel and a second rim bezel which are mounted on the grip body, and as a result, it is possible to solve a problem of leather peeling as well as a defect of an external appearance of a leather matching portion, and to improve fixing force of a leather fitting portion.

To this end, the stitchless steering wheel fitted with leather includes a grip body 10 that is a main body of the steering wheel.

Figure 4:
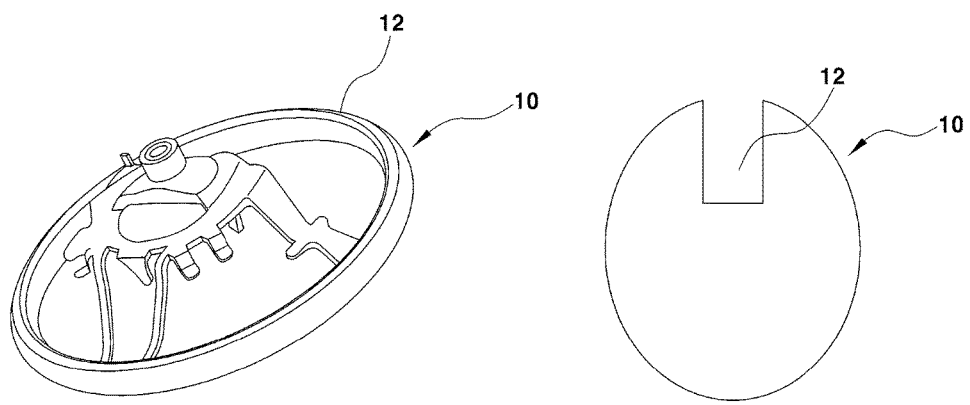
FIG. 4 is a schematic view illustrating a groove formed in a grip body among the components of the stitchless steering wheel fitted with leather according to various embodiments of the present invention.

The grip body 10 is formed in the form of a rim structure having an approximately circular cross section, and a wheel groove 12, which is continuously formed along a length of a circular rim and has a predetermined depth, is provided in a rear surface of the grip body 10 (see FIG. 4).

A first rim bezel 14, which will be described below, may be mounted by being fitted into the wheel groove 12.

A rim portion of the grip body 10 may be completely covered by leather 11.

The stitchless steering wheel fitted with leather includes the first rim bezel 14 as a means that receives end portions of the leather 11 and holds the leather 11 so as to support an edge of a leather matching portion (and a solve a problem of a defect of an external appearance caused by PU collapse).

A bezel groove 13 which is continuously formed along the length of the circular rim and has a predetermined depth, is provided in a front portion of the first rim bezel 14, and a second rim bezel 15, which will be described below, and the end portions of the leather 11 may be mounted by being fitted into the bezel groove 13.

Flanges 22a and 22b, each of which has an arc-shaped cross section and serves to support a portion adjacent to the end portion of the leather 11, that is, a portion adjacent to the end portion of the leather 11 which is inserted into the bezel groove 13, are formed around an upper end portion of the first rim bezel 14.

For example, the flanges 22a and 22b are formed to extend in an arc shape inward and outward from both edges of the bezel groove 13 of the first rim bezel 14, respectively.

In this case, the flanges 22a and 22b may be divided into a plurality of flange sections by a plurality of cut-away portions 18 which is disposed at predetermined intervals along a rim circumference, and a plurality of pierced portions 20, for example, a plurality of pierced portions 20 formed by partially cutting a bottom and a wall of the first rim bezel 14 is formed and disposed at predetermined intervals along the rim circumference in the first rim bezel 14.

Therefore, with the plurality of cut-away portions 18 and the plurality of pierced portions 20, an overall weight of the first rim bezel 14 may be reduced, and particularly, the first rim bezel 14 may have elastic characteristics so that the first rim bezel 14 may be slightly bent. As a result, when the end portions of the leather are inserted into the bezel groove 13 of the first rim bezel 14 or when the second rim bezel 15 is mounted in the bezel groove 13 of the first rim bezel 14, the insertion operation and the mounting operation may be more easily carried out because of the flexibility of the first rim bezel 14.

In particular, second wedge-shaped hooks 16 are formed on inner wall surfaces of the bezel groove 13 of the first rim bezel 14, respectively, so as to face each other or to be in a staggered arrangement, and the second hooks 16 and first hooks 17 formed on the second rim bezel 15 may be caught by each other, and as a result, it is possible to prevent the second rim bezel 15 from being separated from the bezel groove 13.

According to various embodiments, a groove, which has a depth and a width corresponding to a thickness and an area of each of the flanges 22a and 22b formed on the first rim bezel 14, is formed in the grip body 10, and the flanges 22a and 22b of the first rim bezel 14 are inserted and seated into the groove of the grip body 10, such that an outer surface of the grip body 10 may be flush with outer surfaces of the flanges 22a and 22b when the first rim bezel 14 is mounted, and a smooth surface without grooves or bumps may be ensured when the grip body is covered by the leather.

An adhesive may be applied onto the wall surfaces of the bezel groove 13 formed in the first rim bezel 14, and as a result, the end portions of the leather 11, which are received and inserted into the bezel groove 13, may be fixedly attached to the wall surfaces of the bezel groove 13 by using the adhesive.

The first rim bezel 14 may be mounted by fastening the flanges 22a and 22b to the grip body 10 through a plurality of pins 19 in a state in which the first rim bezel 14 is fitted into the wheel groove 12 in the grip body 10.

In particular, the flanges 22a and 22b of the first rim bezel 14 support edge portions of the leather matching portion (i.e., bent portions of the leather at a boundary between the end portions of the leather inserted into the bezel groove and the remaining portions of the leather which are exposed to the outside of the bezel groove), and as a result, it is possible to solve a problem of a defect of an external appearance of the leather matching portion caused by PU collapse.

The stitchless steering wheel fitted with leather includes the second rim bezel 15 as a means for fixing the end portions of the leather 11 which are received in the bezel groove 13 of the first rim bezel 14.

The second rim bezel 15 has a circular band shape, and is mounted by being inserted and fastened into the bezel groove 13 formed in the first rim bezel 14.

The first wedge-shaped hooks 17 are formed on a lower end portion of the second rim bezel 15, and as a result, when the second rim bezel 15 is mounted in the bezel groove 13 of the first rim bezel 14, the first hooks 17 may be fastened by being caught by the second hooks 16 formed in the first rim bezel 14.

Therefore, with the structure in which the second hooks 16 and the first hooks 17 are caught by each other, the second rim bezel 15 may be kept stably mounted in the bezel groove 13 of the first rim bezel 14.

Leather fixing wedge 21, which has a protruding band shape, is formed around an outer circumferential surface of the second rim bezel 15, and the leather fixing wedge 21 serves to press one surface of the leather 11 which abuts on the outer circumferential surface of the second rim bezel 15 in a state in which the second rim bezel 15 is fastened into the bezel groove 13, and as a result, it is possible to increase fixing force at the portions where the leather is fitted.

Here, the leather fixing wedge 21 may be formed in the form of one or more rows of bands, for example, two rows of bands which are continuously formed around the outer circumferential surface of the second rim bezel 15.

Figure 5:
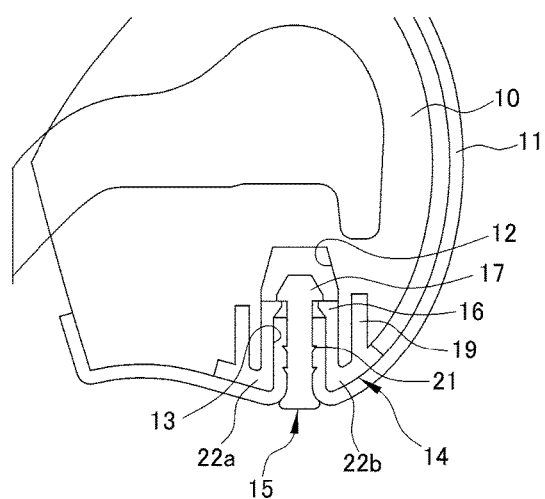
FIG. 5 is an enlarged cross-sectional view illustrating a coupling structure among the components of the stitchless steering wheel fitted with leather according to various embodiments of the present invention.

FIG. 5 is an enlarged cross-sectional view illustrating a coupling structure among the components of the stitchless steering wheel fitted with leather according to various embodiments of the present invention.

As illustrated in FIG. 5, a structure is shown in which the end portions of the leather 11, which covers the grip body 10, are fixed by using the first rim bezel 14 and the second rim bezel 15.

To this end, the first rim bezel 14 is mounted in the wheel groove 12 formed in the grip body 10.

That is, the first rim bezel 14 is coupled to the grip body 10 by inserting the first rim bezel 14 into the wheel groove 12 and fastening the pins 19 to the flanges 22a and 22b tightly attached onto the outer circumferential surface of the grip body 10.

In this case, an adhesive such as glue or epoxy is applied onto the wall surfaces of the bezel groove 13 of the first rim bezel 14.

Next, the grip body 10 is covered by the leather 11, and then both end portions in a width direction of the leather 11 are inserted into the bezel groove 13 of the first rim bezel 14 and attached onto the wall surfaces of the bezel groove 13.

Continually, the second rim bezel 15 is inserted into the bezel groove 13 to which the end portions of the leather 11 are attached, and the second hooks 17 formed at the lower end portion of the second rim bezel 15 are fastened to the second hooks 16 formed in the first rim bezel 14, such that the end portions of the leather are fixedly mounted by the second rim bezel 15 while both surfaces of the second rim bezel 15 press the end portions of the leather which abut on both surfaces of the second rim bezel 15.

In this case, a thickness of the second rim bezel 15 may be set to be relatively greater than a width between the two end portions of the leather which are attached onto the wall surfaces of the bezel groove 13 of the first rim bezel 14, such that the end portions of the leather may be pressed at the same time when the second rim bezel 15 is mounted.

Since the leather fixing wedge 21 is formed on both surfaces of the second rim bezel 15, the leather fixing wedge 21 may be embedded in the end portions of the leather when both surfaces of the second rim bezel 15 press the end portions of the leather, thereby increasing leather fixing force.

As described above, the first rim bezel and the grip body are coupled by the pins (or by hooks, and an adhesive is additionally applied), the end portions of the leather (leather fitting portions) and the first rim bezel are attached by an adhesive, the first rim bezel and the second rim bezel are coupled by the hooks, and the end portions of the leather are fixed by the wedge of the second rim bezel. As a result, it is possible to solve the problem of the related art such as a defect of an external appearance of the leather matching portion caused by PU collapse and the problem of leather peeling. Furthermore, by applying the second rim bezel, it is possible to solve the problem of the related art such as leather peeling occurring during a process of supplying hot air and under a condition of heat-resistance and durability.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A stitchless steering wheel fitted with leather, which is formed by covering a grip body with the leather, the steering wheel comprising:
a first rim bezel received and mounted in a wheel groove of the grip body; and including a bezel groove to receive circumferential end portions of the leather; and
a second rim bezel received and fastened in the bezel groove of the first rim bezel and fixing the circumferential end portions of the leather received in the bezel groove of the first rim bezel,
wherein the first rim bezel, the second rim bezel, and the circumferential end portions of the leather are received in the wheel groove of the grip body and form a void surrounded by a hook of the first rim bezel, a hook of the second rim bezel, and the circumferential end portions of the leather in the wheel groove.

2. The stitchless steering wheel of claim 1, wherein the first rim bezel and the second rim bezel are fastened to each other through coupling of the hook of the first rim bezel which is formed on wall surfaces of the bezel groove and the hook of the second rim bezel that is formed at a lower end portion of the second rim bezel.

3. The stitchless steering wheel of claim 1, wherein flanges having an arc-shaped cross section to support portions adjacent to the circumferential end portions of the leather, are formed around an upper end portion of the first rim bezel.

4. The stitchless steering wheel of claim 3, wherein the flanges of the first rim bezel are divided into a plurality of flange sections by a plurality of cut-away portions which is disposed at predetermined intervals along a rim circumference.

5. The stitchless steering wheel of claim 1, wherein an adhesive for attaching the circumferential end portions of the leather is applied onto wall surfaces of the bezel groove of the first rim bezel.

6. The stitchless steering wheel of claim 1, wherein the first rim bezel is mounted onto the grip body through a plurality of pins.

7. The stitchless steering wheel of claim 1, wherein a plurality of pierced portions is formed in the first rim bezel along a rim circumference to be disposed at predetermined intervals.

8. The stitchless steering wheel of claim 1, wherein a leather fixing wedge fixing one surface of the leather which abuts an outer circumferential surface of the second rim bezel in a state in which the second rim bezel is fastened in the bezel groove, is formed around the outer circumferential surface of the second rim bezel.

9. The stitchless steering wheel of claim 1, wherein the first rim bezel, the second rim bezel, and the circumferential end portions of the leather are received in the wheel groove of the grip body while the hook of the first rim bezel directly contacts with the hook of the second rim bezel.

* * * * *